Patented Feb. 4, 1936

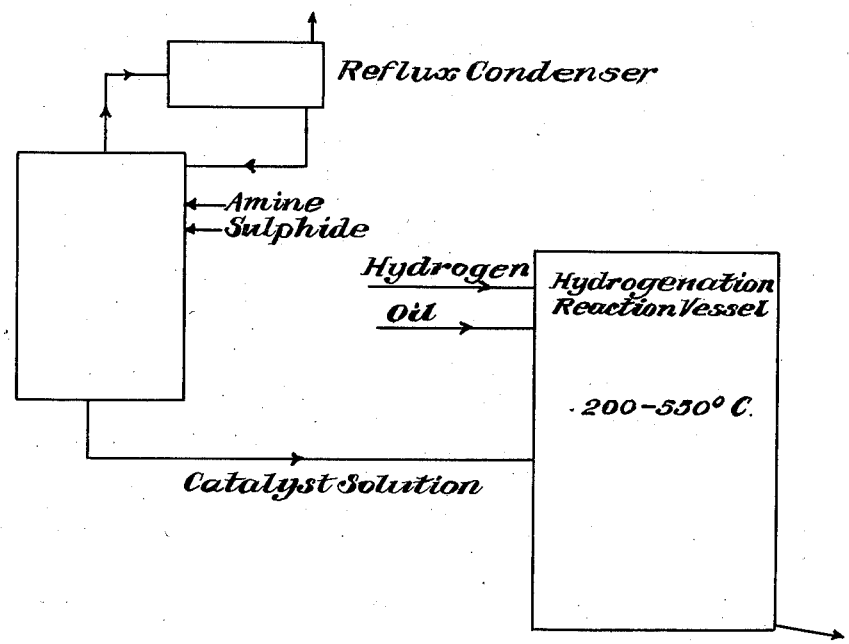

2,029,895

UNITED STATES PATENT OFFICE 2,029,895

PROCEDURE FOR THE HYDROGENIZING AND/OR SPLITTING OF COAL, TARS, MINERAL OILS, AND THE LIKE

Wilhelm Rittmeister, Dessau/Anhalt, Germany, assignor, by mesne assignments, to E. I. du Pont de Nemours & Co., Wilmington, Del., a corporation of Delaware Application June 1, 1933, Serial No. 673,880
In Germany June 2, 1932

13 Claims. (Cl. 196—53)

For the converting of coal, coal distillates, tars, crude cresols, mineral oils, mineral oil products, distillation residues into products of a higher quality with the same or an inferior number of carbon atoms than in the initial products, by means of catalytic hydrogenation, a continuous operation in using solid catalysts is scarcely practicable, the beginning wear or the poisoning of the active surface of the solid catalysts making it necessary to open frequently the reaction vessels and to renew the catalyst. Further interruptions of the operation occur frequently by obstructions of conduits and valves caused by particles of the solid contact mass carried off with the reaction matter. Suggestions had therefore repeatedly been made in the sense of employing catalysts in a liquid form. Thus for the solidification of fats one employed sebacic metals such as nickel oleate which are soluble in the oils to be hardened.

However, these sorts of catalysts cannot be used for the present procedure because of their sensitiveness to poison and it is very difficult to transform in an analogous manner the metals of the 6th group of the periodic system, which are particularly fast to poisons, into liquids or into compounds soluble in organic liquids. It has been suggested to convert halogen compounds of the molybdenum with fatty acids or naphthenic acids, whereby the resulting combinations are soluble in hydrocarbons. Yet these compounds have the inconvenience of containing an amount of chlorine which is not desirable because of its detrimental action upon the working appliances; moreover when coming into contact with water they decompose by hydrolyzing.

Now it has been found that in combining the sulphides of the metals of the 6th group of the periodic system with organic bases, it is possible to obtain in a very simple way soluble metal compounds of a very efficient catalytic action and of an extraordinary fastness to poisons, without showing the drawbacks mentioned above.

With the employment of molybdenum- or tungsten- trisulphide respectively catalysts of a particular efficiency were obtained. Among the organic bases primary and secondary bases have proved to be fit and in selecting them for the producing of catalysts the basic amines of a particular strength are to be preferred, such as cyclohexylamine, piperidine, deka-hydronaphthylamine and furthermore primary aliphatic amines such as butyl-, hexyl-, octyl-, dodecyl-, cetyl- and octa-decylamine. One dissolves the said sulphides under warming in the bases or one boils under reflux respectively until the sulphides will be dissolved. Thereby it has further been found that in certain cases it is advantageous to couple the said metal sulphides with the organic bases with an addition of small amounts of sulphur. The liquid catalysts produced according to the present method are excellent for the hydrogenation or for the hydrogenizing splitting of coal, tars, cresols, naphthenic acids, mineral oils or other organic combinations. In order to obtain really good effects with the above named catalysts, enhanced pressures of more than 20 atm. are necessary. The temperatures to be applied lie between 200 and 550° C. The arising hydrogenation or hydrogenation with splitting depends upon the temperatures i. e. the former occurs at lower and the latter at higher temperatures, these temperatures being different according to the chosen initial material. If for instance crude naphthaline is used, a simple hydrogenation to tetra- and deka-hydronaphthaline will occur at about 400 to 440° C., whereas at 490 to 500° C. the hydrogenation occurs to lower molecular compounds under splitting of the ring.

The technical progress in using catalysts of the present procedure consists in the practibility of working up coal, coal distillates, tars etc. in a continuous manner, because owing to their fluid character they are allowed to be pumped or pressed into the reaction vessels alone or together with the stuffs to be converted, without necessitating the opening of the working appliances. In this way it is very easy to dose their admixture. An obstruction of conduits and valves can not arise any more. A further advantage is to be seen in the fact that these catalysts dissolve themselves as liquids in the reaction matter so that their distribution is by far better than that of solid catalysts and thus the efficient surface is remarkably increased. In quite striking a manner these catalysts have also proved to be considerably more efficient than the metal sulphides they are based upon, so that not only a dissolving action must be ascribed to the applied organic bases, but it must even be presumed that they possess also an activating effect.

The single figure is a diagrammatic flow sheet of steps in the process.

Example 1

250 g. of melted crude naphthaline are combined with 12,5 g. molybdenum sulphide dissolved in 50 g. of cyclohexylamine. This solution, after having been pressed with hydrogen at 125 atm., is heated in a 4 litres-autoclave to 400–440° C.

and kept at this temperature for 2 hours. The reaction product is obtained in an excellent output and free of naphthaline; after the separation of the catalyst and the cyclohexane deriving from the latter its specific gravity is 0,925 at 20° C. and it consists materially of ⅔ of tetrahydronaphthaline and ⅓ of deka-hydronaphthaline.

Instead of cyclohexylamine one can likewise make use of deka-hydronaphthylamine with the same good results.

*Example 2*

12,5 g. of molybdenum sulphide are dissolved in 50 g. of piperidine together with 3 g. of sulphur and the thus obtained solution is coupled with 250 g. of melted raw naphthaline. The total solution, after a preliminary hydrogen pressure of 125 atm. is then heated in a 4 litres-autoclave to 490–500° C. and kept at this temperature for 2 hours. 80% of the thus obtained reaction product are boiled at 185° C.

The piperidine may be replaced by octyl- or dodecylamine with the same good result.

*Example 3*

By heating 500 g. of crude cresol with a liquid containing 20 g. of tungsten-trisulphide in 75 g. of octadecylamine, for 2 hours to 450–470° C. and under an 80 atm. initial hydrogen pressure, one obtains a reaction material practically free of cresol and consisting of toluol, hydrogenized toluol and benzol.

It is also allowed to employ cetylamine instead of octadecylamine with the same satisfactory result.

*Example 4*

500 g. of a raw lubricating oil are coupled with a solution of 20 g. of molybdenum sulphide contained in 75 g. of hexylamine; then one heats in a 4 litres autoclave to 380° C. after a previous hydrogen pressure of 100 atm., keeping this temperature for 2 hours.

The reaction product is washed after filtration with diluted sulphuric acid and a solution of caustic soda; by distilling it is liberated from the easily boiling portions. The residue amounting to about 470 g. represents a perfectly saturated lubricating oil of high quality.

What I claim is:—

1. Procedure for the hydrogenizing of coal, coal distillates, tars, cresols, mineral oils, distillation residues and the like, characterized in that the initial materials are treated with hydrogen at enhanced pressures and enhanced temperatures in the presence of a catalyst obtained by dissolving a sulphide of a metal of the 6th group of the periodic system in a strong base of the group consisting of the primary and secondary amines.

2. Procedure for the hydrogenizing of coal, coal distillates, tars, cresols, mineral oils, distillation residues and the like, characterized in that the initial materials are treated with hydrogen at enhanced pressures and enhanced temperatures in the presence of a catalyst obtained by dissolving molybdenum sulphide in a strong base of the group consisting of the primary and secondary amines.

3. Procedure for the hydrogenizing of coal, coal distillates, tars, cresols, mineral oils, distillation residues and the like, characterized in that the initial materials are treated with hydrogen at enhanced pressures and enhanced temperatures in the presence of a catalyst obtained by dissolving tungsten sulphide in a strong base of the group consisting of the primary and secondary amines.

4. Procedure for the hydrogenizing of coal, coal distillates, tars, cresols, mineral oils, distillation residues and the like, characterized in that the initial materials are treated with hydrogen at enhanced pressures and enhanced temperatures in the presence of a catalyst obtained by dissolving a sulphide of a metal of the 6th group of the periodic system in cyclohexylamine.

5. Procedure for the hydrogenizing of coal, coal distillates, tars, cresols, mineral oils, distillation residues and the like, characterized in that the initial materials are treated with hydrogen at enhanced pressures and enhanced temperatures in the presence of a catalyst obtained by dissolving a sulphide of a metal of the 6th group of the periodic system in a primary aliphatic amine.

6. Procedure for the hydrogenizing of coal, coal distillates, tars, cresols, mineral oils, distillation residues and the like, characterized in that the initial materials are treated with hydrogen at enhanced pressures and enhanced temperatures in the presence of a catalyst obtained by dissolving a sulphide of a metal of the 6th group of the periodic system in piperidine.

7. Procedure for the hydrogenizing of coal, coal distillates, tars, cresols, mineral oils, distillation residues and the like, characterized in that the initial materials are treated with hydrogen at enhanced pressures and enhanced temperatures in the presence of a catalyst obtained by dissolving a sulphide of a metal of the 6th group of the periodic system in deka-hydronaphthylamine.

8. Procedure for the hydrogenizing of coal, coal distillates, tars, cresols, mineral oils, distillation residues and the like, characterized in that the initial materials are treated with hydrogen at enhanced pressures and enhanced temperatures in the presence of a catalyst obtained by dissolving a sulphide of a metal of the 6th group of the periodic system in a strong base of the group consisting of the primary and secondary amines and with an addition of sulphur.

9. Procedure for the hydrogenizing of coal, coal distillates, tars, cresols, mineral oils, distillation residues and the like characterized in that the initial materials are treated with hydrogen at pressures above 20 atmospheres in the presence of a catalyst obtained by dissolving a sulphide of a metal of the 6th group of the periodic system in a base of the group consisting of cyclohexylamine, piperidine, deka-hydronaphthylamine and primary aliphatic amines having 4 to 18 carbon atoms in the alkyl radical.

10. Procedure for the hydrogenizing of coal, coal distillates, tars, cresols, mineral oils, distillation residues and the like characterized in that the initial materials are treated with hydrogen at pressures above 20 atmospheres and at temperatures between 200 and 550° C. in the presence of a catalyst obtained by dissolving a sulfide of a metal of the sixth group of the periodic system in an amine of the group consisting of cyclohexylamine, piperidine, deka-hydronaphthylamine and primary aliphatic amines having 4 to 18 carbon atoms in the alkyl radical until splitting of the initial materials occurs, substantially as described.

11. Procedure for the hydrogenizing of coal, coal distillates, tars, cresols, mineral oils, distillation residues and the like, as defined in claim 1, wherein the treatment proceeds at a pressure of more than 20 atmospheres.

12. Procedure for the hydrogenizing of coal, coal distillates, tars, cresols, mineral oils, distillation residues and the like, as defined in claim 1, wherein the treatment proceeds at a temperature approximating 200 to 550° C.

13. Procedure for the hydrogenizing of coal, coal distillates, tars, cresols, mineral oils, distillation residues and the like, as defined in claim 1, wherein the treatment proceeds at a pressure of more than 20 atmospheres and a temperature of 200 to 550° C.

WILHELM RITTMEISTER.